Figure 1:
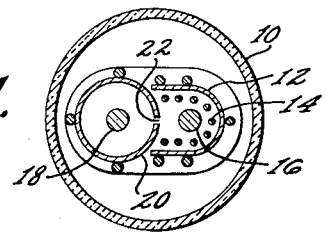

April 10, 1956  E. O. JOHNSON ET AL  2,741,734
INVERTER CIRCUIT
Filed Oct. 31, 1952

INVENTORS
Edward O. Johnson &
William M. Webster, Jr.
BY
ATTORNEY

United States Patent Office 2,741,734
Patented Apr. 10, 1956

2,741,734
INVERTER CIRCUIT

Edward O. Johnson and William M. Webster, Jr., Princeton, N. J., assignors, by mesne assignments, to the United States of America as represented by the Secretary of the Army Application October 31, 1952, Serial No. 317,962

8 Claims. (Cl. 321—36)

This invention relates to inverter circuits of the type used to convert D.-C. electrical energy into A.-C. electrical energy, and more particularly to a novel inverter circuit employing gaseous electron tubes. While not specifically related thereto, the inverter circuit of the present invention is particularly applicable for converting efficiently the low D.-C. voltage supplies in automobiles, airplanes, and tanks into relatively high, A.-C. voltages.

The main source of D.-C. voltage in automobiles, airplanes and tanks is a battery having a voltage output range from about 6 volts to about 28 volts. It is often necessary to convert this relatively low unidirectional voltage into an alternating voltage in order to operate certain types of equipment requiring an A.-C. voltage input, as for instance 110 volts A.-C. Inverter circuits employing thyratron tubes have been used to obtain the desired conversion of A.-C. power to D.-C. power. A serious objecttion, however, to the use of inverter circuits employing thyratron tubes is the fact that the efficiency of these circuits is relatively low because of the power loss resulting from the voltage drop across the thyratron tubes when they are conducting.

If a thyratron inverter circuit is used to convert a unidirectional voltage of 28 volts, for example, into an A.-C. voltage, it can be shown that the maximum tube efficiency will be $$100\left(1-\frac{10}{28}\right)=64 \text{ percent}$$

where the arc drop across the thyratron tube is 10 volts. In a copending application of the present co-inventor, E. O. Johnson, Serial No. 185,745, filed September 20, 1950, and assigned to the assignee of the present invention, there is described and claimed a gaseous electron tube in which the function of supplying energy to provide a space charge neutralizing plasma and the function of providing a field to draw work current are separated. Since the arc drop across the latter gaseous tube is in the neighborhood of two volts when it is conducting, it can be shown that the maximum efficiency of this type of tube will be $$100\left(1-\frac{2}{28}\right)=93 \text{ percent}$$

It is, therefore, evident that the efficiency of an inverter circuit using gaseous tubes is approximately, inversely proportional to the voltage drop across the tubes while they are conducting, other things being equal.

It is, therefore, an important object of the present invention to provide a novel and highly efficient inverter circuit employing gas tubes of the type described.

It is a further object of the present invention to provide an improved inverter circuit, employing gas type tubes, particularly adapted to convert a low unidirectional voltage into a relatively higher A.-C. voltage with a minimum power loss in the tubes.

It is a still further object of the present invention to provide a novel inverter circuit, employing gaseous tubes of the type described connected in a parallel-type circuit, which is simple and positive in operation, and highly efficient in use.

These and further objects of the present invention are attained in a novel parallel-type inverter circuit, employing gaseous discharge tubes of the type described, wherein the working function and the ionization function of the tubes are separated. A pair of gaseous tubes each having an anode, a grid, a main cathode, an auxiliary cathode, and a garrote or constricting electrode are connected in a parallel-type inverter circuit. The source of unidirectional voltage to be converted into a source of A.-C. voltage is connected in the anode-main cathode circuit of each tube. The anodes of each tube are coupled to an output transformer. The grid of each tube is connected to a source of voltage through a separate grid resistor in order to bias them negatively with respect to the main cathodes. Means are provided to connect a source of alternating voltage between the auxiliary cathodes of the tubes to produce alternately an ionization discharge in each tube between its auxiliary and main cathodes. Positive ions resulting from the auxiliary discharge are attracted to the negatively biased grid and produce a positive ion current through the grid resistor, whereby the grid approaches the voltage of the main cathode. Consequently, the negative voltage on the grid becomes less negative and the "hold off" action of the grid is reduced to a point where conduction is permitted in the anode-main cathode circuit of the tube, and the tube is fired. The firing of one tube causes the other tube to become extinguished. The wave forms produced by current flowing through each tube are combined in the output transformer and a sine wave of good characteristics results.

Figure 2:
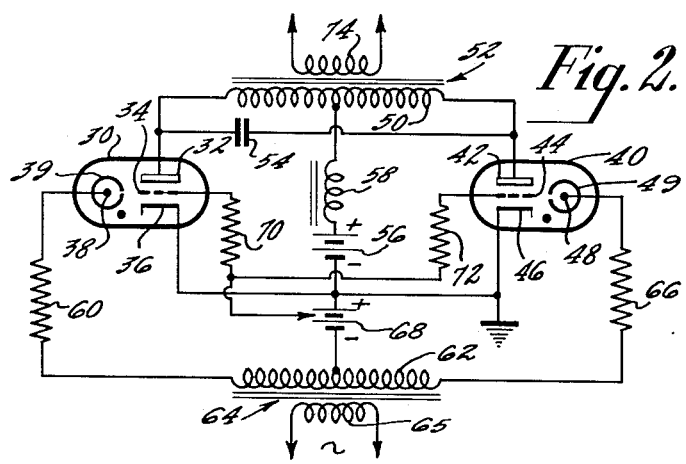
Figure 3A:
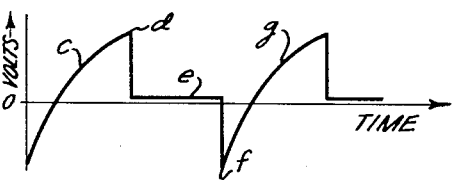
Figure 3B:
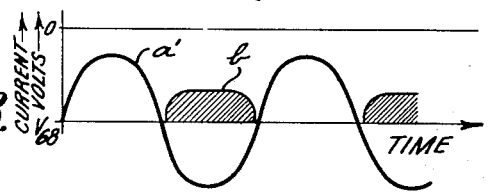

The novel features of the invention as well as the invention itself, both as to its organization and method of operation, will best be understood by the following description when considered in connection with the accompanying drawing in which:

Fig. 1 is a cross-sectional view of a gaseous electron tube of the type used in the inverter circuit, in accordance with the present invention, Fig. 2 is a circuit diagram of an inverter circuit, in accordance with the present invention, and Figs. 3A and 3B are graphs used to explain the operation of the inverter circuit of Fig. 2.

Referring now to Fig. 1, there is shown a cross-sectional view of a gas tube of the type utilized in the present invention. A tube envelope 10 contains a U-shaped anode 12 of sheet metal which is disposed externally to and in juxtaposed position with a control grid 14 having relatively coarse spacing. A main cathode 16 is maintained within and partially surrounded by the control grid 14 and the anode 12. An auxiliary cathode 18, laterally spaced from the main cathode 16, is maintained coaxially with respect to a slotted cylindrical constricting electrode or garrote 20. An elongated, narrow slot 22 in the constricting electrode 20 extends along a plane through the axes of the auxiliary and main cathodes 16, 18, respectively. This structure permits a desired degree of ionization to be obtained between the auxiliary and main cathodes with a considerable minimization of power required to sustain ionization within the tube. The anode 12 and the main cathode 16 of the tube provide the load circuit through which load currents can be passed in the manner of conventional tubes. These load currents may be controlled by the potential applied to the control grid 14. The auxiliary cathode 18 is an additional electrode for cooperation with the anode 12 and/or the main cathode 16 to provide for the ionization of the gas in the tube. The envelope 10 is filled with an ionizable gas, such as helium.

This gaseous electron tube is completely shown, described and claimed in the above-mentioned copending application by E. O. Johnson. Ionization or breakdown of the gas occurs between the auxiliary cathode and the main cathode and/or the anode of the tube. There is thus provided within the gas envelope a plasma which acts as an excellent conductor and which provides a low resistance connection between the anode and the main cathode of the tube. The density of the plasma generated in the tube is controlled at least in part by the amount of current flowing through the ionization circuit. Accordingly, the effective resistance between the main cathode 16 and the anode 12 may be controlled effectively by controlling the current flow in the ionization circuit. Alternately, the load current may be controlled by the potential applied to the control grid 14 interposed between the main cathode 16 and the anode 12. The characteristics of the type of gaseous tube utilized are such that a relatively small change in the ionization current is effective to produce a relatively large change in the load circuit.

Referring now to Fig. 2, there is shown a parallel-type inverter circuit, in accordance with the present invention, employing a pair of gaseous tubes 30, 40, of the type described. Each of the tubes 30, 40 has an anode 32, 42, a grid 34, 44, a main cathode 36, 46, an auxiliary cathode 38, 48 and a constricting electrode 39, 49, respectively. The anodes 32, 42 of the tubes 30, 40, are connected to each other through the primary winding 50 of an output transformer 52. The anodes 32, 42 are also connected to each other through a commutating capacitor 54. The main cathodes 36, 46 of the tubes 30, 40 are connected to each other and to a source of reference potential, such as ground. A source of unidirectional voltage 56, which is to be converted into an A.-C. voltage, has its negative terminal connected to the main cathodes 36, 46 of the tubes 30, 40, and its positive terminal connected to a center tap on the primary winding 50 of the transformer 52, through a smoothing choke 58. The auxiliary cathodes 38, 48 of the tubes 30, 40 are connected to each other through a series circuit comprising a current limiting resistor 60 connected to the auxiliary cathode 38, a secondary winding 62 of an input transformer 64, and a current limiting resistor 66 connected to the auxiliary cathode 48. A source of unidirectional voltage 68, having its positive terminal connected to the main cathodes 36, 46 of the tubes 30, 40, and its negative terminal connected to a center tap of the secondary winding 62, is provided to bias negatively the auxiliary cathodes 38, 48, with respect to their main cathodes 36, 46. A source of alternating voltage from any conventional source (not shown) is applied across the primary winding 65 of the input transformer 64. Each of the grids 36, 46 of the tubes 30, 40 is connected to a point on the source of unidirectional voltage 68, through separate resistors 70 and 72, respectively.

The operation of the parallel-type inverter circuit illustrated in Fig. 2 will now be described. Let it be assumed that the tube 40 is conducting current through its anode-main cathode circuit, and that the tube 30 is cut off. Let it be assumed, further, that as a result of the alternating current applied to the primary 65, a transformed negative-going voltage is applied to the auxiliary cathode 38 of the tube 30, and a transformed positive-going voltage is applied to the auxiliary cathode 48 of the tube 40. The difference in potential now existing between the auxiliary cathode 38 and the main cathode 36 of the tube 30 will produce an ionization discharge within the tube 30. Positive ions resulting from the ionization discharge, will be attracted to the negatively biased grid 34 and a positive ion current will flow through the grid resistor 70. Consequently, the voltage of the grid 34 will become less negative and approach the voltage of the main cathode 36. Current will, therefore, flow in the anode-main cathode circuit of the tube 30, and the voltage drop across the tube 30 will be in the order of one to two volts. The negative-going voltage at the anode 32 of the tube 30 resulting from the current conduction through the tube 30, causes a negative-going voltage to be applied to the anode 42 of the tube 40, through the commutating capacitor 54. This negative-going voltage will cut off conduction through the tube 40. If the tubes 30, 40 were ordinary thyratrons, the voltage drop across them during the conduction period would be in the order of about 10 volts. By providing circuitry in accordance with the present invention, whereby an ionization discharge is produced between the auxiliary and main cathodes, the voltage drop across the tubes 30, 40 is in the order of only one or two volts. Since the efficiency of an inverter circuit is approximately inversely proportional to the voltage drop across the gaseous tubes, it is evident that the circuit in accordance with the present invention is considerably more efficient than conventional inverter circuits. This is especially true where the unidirectional voltage source, such as the voltage source 56, is of a relatively low voltage.

Referring now to Fig. 3B, there is shown a portion $a'$ of an alternating voltage wave of the form applied to the auxiliary cathodes 38, 48. This A.-C. wave is superimposed on the voltage $V_{68}$ represented by the voltage source 68. Considering only the tube 30 for the sake of simplicity of explanation, it can be seen that during the positive-going half cycles, there will be no ionization discharge between the auxiliary and main cathodes 38, 36, respectively, of the tube 30. During the negative-going half cycles, however, the difference in potential between the auxiliary and main cathodes 38, 36 of the tube 30 is sufficiently great to cause an ionization discharge therebetween. The ionization current flowing in the tube 30 as a result of the negative-going pulses applied to the auxiliary cathode 38 is shown by the shaded portion $b$ of Fig. 3B.

Variations in the anode voltage of the anode 32 of the tube 30, with respect to time, is illustrated graphically in Fig. 3A. The portion $c$ of the curve represents the voltage at the anode 32 while the tube 30 is cut off. During this period, the voltage at the anode 32 increases at a rate determined by the circuit parameters comprising the commutating capacitor 54, the smoothing choke 58, and the reflected impedance of the primary 50 of the output transformer 52 caused by the load (not shown). When the voltage at the anode 32 has reached the point $d$, the tube is fired as a result of the ionization discharge between the auxiliary and main cathodes 38, 36. The voltage at the anode 32 is now represented by the portion $e$ of the voltage-time curve. The tube 30 continues to conduct until a negative-going transformed voltage pulse is applied to the auxiliary cathode 48 of the tube 40. As soon as the tube 40 begins to conduct, a negative-going voltage due to the drop in potential at the anode 42 is applied to the anode 32 of the tube 30, through the commutating capacitor 54. The voltage at the anode 32 now drops to the point $f$ of the voltage-time curve and the tube 30 is cut off. During the cut off period, the voltage at the anode 32 increases in accordance with the circuit parameters as explained above, and is represented by the portion $g$ of the curve. It is noted that the operation of the tube 40 with respect to the tube 30 is 180° out of phase. The voltages resulting in the primary 50 of the output transformer 52, as a result of current flowing through the tubes 30 and 40, are combined and the transformed voltage appearing across the secondary 74 of the output transformer 52 is an alternating voltage having the characteristics of a good sine wave.

By connecting each of the grids 34, 44 of the tubes 30, 40 to a point of negative potential with respect to their main cathodes, through the separate resistors 70, 72, it will be observed that the grids 34, 44 effectively "hold off" conduction through the tubes when there is no ionization discharge, and effectively aid conduction when there is an ionization discharge. As explained above, the "hold off" action of each negatively biased grid, in accordance with the present invention, is counteracted by the positive ion current through the grid resistor resulting from positive ions produced by the ionization discharge. It has been found that satisfactory results are obtained with an inverter circuit, in accordance with the present invention, regardless of whether or not the constricting electrodes 39, 49 are connected to the auxiliary cathodes 38, 48 of the tubes 30, 40, respectively.

In accordance with the objects of the present invention, there has been shown and described above, a novel, useful and highly efficient inverter system using circuitry adapted to employ gas tubes of the type described to provide a high current, low impedance output. Means, associated with each grid, also were provided to alternately "hold off" conduction and to enhance conduction in each tube in phase with the ionization discharge.

What is claimed is:

1. An inverter circuit comprising a pair of gas tubes each having an anode, a main cathode, a grid between said anode and said main cathode, an auxiliary cathode, and a constricting electrode partially surrounding said auxiliary cathode, output means coupled to said anodes, means to apply a source of unidirectional voltage between the anode and the main cathode of each of said tubes, means connected between the auxiliary cathode and the main cathode of each tube to vary the voltage of the auxiliary cathode periodically with respect to the main cathode, and means coupled to each grid to bias each grid negatively with respect to the main cathode in each tube.

2. An inverter circuit comprising a pair of gas tubes each having an anode, a main cathode, a grid between said anode and said main cathode, an auxiliary cathode, and a constricting electrode partially surrounding said auxilary cathode, output means coupled to said anodes, means to apply a source of unidirectional voltage between the anode and the main cathode of each of said tubes, alternating voltage means connected between the auxiliary cathode and the main cathode of each tube to vary the voltage of the auxiliary cathode periodically with respect to the main cathode, means coupled to each grid to bias each grid negatively with respect to the main cathode in each tube, said last-mentioned means comprising a second source of unidirectional voltage having a positive terminal connected to said main cathodes and a negative terminal connected to said alternating voltage means, two resistors connected in series with each other and in series with said grids, and each of said resistors being connected to a point of voltage on said second source.

3. An inverter circuit comprising a pair of gas tubes each having an anode, a main cathode, a grid between said anode and said main cathode, an auxiliary cathode, and a constricting electrode partially surrounding said auxiliary cathode, output means coupled to said anodes, a capacitor connected between said anodes, means to apply a unidirectional voltage between the anode and the main cathode of each of said tubes, a pair of resistors connected in series with said grids and in series with each other, means to bias said grids negatively with respect to said main cathodes, and alternating voltage means connected between the auxiliary cathode and the main cathode of each tube to vary the voltage of the auxiliary cathode periodically with respect to the main cathode whereby to fire said tubes alternately.

4. An inverter circuit comprising a pair of gas tubes each having an anode, a main cathode, a grid between said anode and said main cathode, an auxiliary cathode, and a constricting electrode surrounding a portion of said auxilary electrode, an output transformer having primary and secondary windings, said anodes being connected to each other through said primary winding, a capacitor connected between said anodes, said cathodes being connected to each other, means including said primary winding to apply a first source of unidirectional voltage between the main cathode and the anode of each tube, an input transformer having a primary winding and center-tapped secondary winding, said auxiliary cathodes being connected to each other through said center-tapped secondary winding, a second source of unidirectional voltage connected between said main cathodes and the center-tap of said secondary winding, and a separate resistor connected between each grid and a point of voltage on said second source.

5. In a parallel-type inverter circuit of the type used to convert a unidirectional voltage source into a source of alternating voltage, and employing first and second gas tubes each comprising at least an anode, a main cathode, a grid between said anode and said main cathode, and an anode-main cathode circuit for each tube including said unidirectional voltage; the improvement comprising an auxiliary cathode and a constricting electrode surrounding a portion of said auxiliary cathode in each of said tubes, alternating voltage means connected between the main cathode and the auxiliary cathode of each tube to provide alternately an ionization discharge in each tube between the main cathode and auxiliary cathode, and means to bias the grid in each tube negatively with respect to the main cathode.

6. In a parallel-type inverter circuit of the type used to convert a unidirectional voltage into a source of alternating voltage, and employing first and second gas tubes each comprising at least an anode, a main cathode, a grid between said anode and said main cathode, and an anode-main cathode circuit for each tube including said unidirectional voltage; the improvement comprising an auxiliary cathode and a constricting electrode surrounding a portion of said auxiliary cathode in each of said tubes, an input transformer having a secondary winding connected in series with said auxiliary cathodes, means to bias each auxiliary cathode negatively with respect to each main cathode, and a separate resistor connected between each of said grids and said bias means.

7. In a parallel-type inverter circuit of the type used to convert a unidirectional voltage into an alternating voltage, and employing first and second gas tubes each comprising at least an anode, a main cathode, a grid between said anode and said main cathode, and an anode-main cathode circuit for each tube including said unidirectional voltage; the improvement comprising an auxiliary cathode and a constricting electrode surrounding a portion of said auxiliary cathode in each of said tubes, means connected between said auxiliary cathodes to produce alternately an ionization discharge between the main cathode and auxiliary cathode in each tube, and means to bias the grid in each tube negatively with respect to the main cathode therein.

8. In a parallel inverter circuit of the type used to convert a unidirectional voltage into an alternating voltage, and employing first and second gas tubes each comprising at least an anode, a main cathode, a grid between said anode and said main cathode, and an anode-main cathode circuit for each tube including said unidirectional voltage; the improvement comprising an auxiliary cathode and a constricting electrode partially surrounding said auxiliary cathode in each of said tubes, means connected between the auxiliary cathode and main cathode of each tube to produce alternately an ionization discharge between the main cathode and auxiliary cathode in each tube, and means to bias the grid in each tube negatively with respect to the main cathode therein, said last-mentioned means comprising a second source of unidirectional voltage connected between said main cathodes and said means connected between said auxiliary cathodes, and a separate resistor connected between the grid of each tube and a point on said second source.

References Cited in the file of this patent

UNITED STATES PATENTS

| | | |
|---|---|---|
| 2,284,389 | Hansen | May 26, 1942 |
| 2,456,754 | Szikla | Dec. 21, 1948 |
| 2,611,684 | Webster | Sept. 23, 1952 |